(12) United States Patent
Nagakura et al.

(10) Patent No.: US 10,982,628 B2
(45) Date of Patent: Apr. 20, 2021

(54) CONTROLLER FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota (JP)

(72) Inventors: Keisuke Nagakura, Anjo (JP); Kuniyuki Sasaki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 16/215,326

(22) Filed: Dec. 10, 2018

(65) Prior Publication Data

US 2019/0195177 A1 Jun. 27, 2019

(30) Foreign Application Priority Data

Dec. 27, 2017 (JP) .............................. JP2017-251356

(51) Int. Cl.
| | |
|---|---|
| *F02D 41/00* | (2006.01) |
| *F02M 26/49* | (2016.01) |
| *F02D 41/14* | (2006.01) |
| *F02D 35/02* | (2006.01) |

(52) U.S. Cl.
CPC ......... *F02M 26/49* (2016.02); *F02D 41/0052* (2013.01); *F02D 41/0065* (2013.01); *F02D 41/0085* (2013.01); *F02D 41/1454* (2013.01); *F02D 35/023* (2013.01); *F02D 2200/04* (2013.01); *F02D 2200/101* (2013.01); *F02D 2200/1002* (2013.01)

(58) Field of Classification Search
CPC . F02M 26/49; F02D 41/0052; F02D 41/0065; F02D 41/0085; F02D 41/1454; F02D 35/023; F02D 2200/04; F02D 2200/101; F02D 2200/1002
USPC ............... 123/672, 436, 679, 681, 691, 692; 73/114.11, 114.25, 114.72; 701/103, 110, 701/111
See application file for complete search history.

(56) References Cited

U.S. PATENT DOCUMENTS 5,881,693 A * 3/1999 Mizuno ............... F02D 41/1498
123/295
8,401,764 B2 * 3/2013 Jentz .................... F02D 41/0025
123/1 A (Continued)

FOREIGN PATENT DOCUMENTS

| JP | 2009-156216 A | 7/2009 |
| JP | 2011-226363 A | 11/2011 |
| WO | 2011/055463 A1 | 5/2011 |

*Primary Examiner* — Gonzalo Laguarda
(74) *Attorney, Agent, or Firm* — Oliff PLC (57) ABSTRACT

A controller for an internal combustion engine including a plurality of cylinders, a fuel injection valve for supplying a fuel to each cylinder, an EGR passage connecting an exhaust passage and an intake passage, and an EGR valve adjusting a flow rate of exhaust flowing into the intake passage from the exhaust passage via the EGR passage, the controller includes an electronic control unit. The electronic control unit is configured to execute determination processing for determining that a degree of an imbalance abnormality is larger when a torque fluctuation amount is relatively large than when the torque fluctuation amount is relatively small.

10 Claims, 6 Drawing Sheets

(56) References Cited

U.S. PATENT DOCUMENTS

| | | | |
|---|---|---|---|
| 8,718,902 B2* | 5/2014 | Katou | ................ F02D 41/0065 |
| | | | 123/568.21 |
| 9,650,977 B2* | 5/2017 | Martin | ................ F02D 41/0085 |
| 9,657,692 B2* | 5/2017 | Chiu | ...................... F02M 26/28 |
| 2009/0171550 A1 | 7/2009 | Teraya | |
| 2012/0215427 A1 | 8/2012 | Miyamoto et al. | |

* cited by examiner

|  | 10 | 20 | ... | 100 |
|---|---|---|---|---|
| 1000 | A | B | ... | C |
| 1500 | D | E | ... | F |
| ... | ... | ... | ... | ... |
| 5000 | G | H | ... | I |

NE $$\begin{cases} Ta \geq Tath : \theta* = 0 \\ THW < Tth : 0 < \theta* < \theta*(Regr*) \end{cases}$$

CONTROLLER FOR INTERNAL COMBUSTION ENGINE AND CONTROL METHOD FOR INTERNAL COMBUSTION ENGINE

INCORPORATION BY REFERENCE

The disclosure of Japanese Patent Application No. 2017-251356 filed on Dec. 27, 2017 including the specification, drawings and abstract is incorporated herein by reference in its entirety.

BACKGROUND

1. Technical Field

This disclosure relates to a controller for an internal combustion engine and a control method for an internal combustion engine applied to an internal combustion engine including a plurality of cylinders, a fuel injection valve for supplying a fuel to each cylinder, an exhaust gas recirculation (EGR) passage connecting an exhaust passage and an intake passage, and an EGR valve adjusting the flow rate of exhaust flowing into the intake passage from the exhaust passage via the EGR passage.

2. Description of Related Art

Japanese Unexamined Patent Application Publication No. 2011-226363 (JP 2011-226363 A) discloses a controller determining the presence or absence of an imbalance abnormality based on torque pulsation (torque fluctuation amount) obtained from crank angle sensor output. The controller corrects an abnormality determination threshold in accordance with an EGR gas influence component based on the opening degree of an EGR control valve or the like in view of a change in the degree of inter-cylinder imbalance attributable to a change in the degree of inter-cylinder air-fuel ratio variation resulting from inter-cylinder EGR gas amount variation.

SUMMARY

The inventor of this disclosure found that, even in the absence of the imbalance abnormality, a torque fluctuation amount is larger at a relatively large EGR rate than at an EGR rate of zero. Accordingly, imbalance abnormality determination processing setting on the premise of control for an EGR rate of zero may result in an erroneous determination in which the degree of the imbalance abnormality is determined to be larger than the actual degree in a case where the EGR rate exceeds zero. Examples of the erroneous determination include determining that the imbalance abnormality is present in a case where the imbalance abnormality is absent in reality.

A first aspect of the disclosure relates to a controller for an internal combustion engine including a plurality of cylinders, a fuel injection valve for supplying a fuel to each cylinder, an EGR passage connecting an exhaust passage and an intake passage, and an EGR valve adjusting a flow rate of exhaust flowing into the intake passage from the exhaust passage via the EGR passage. The controller includes an electronic control unit configured to execute determination processing for determining that a degree of an imbalance abnormality is larger when a torque fluctuation amount is relatively large than when the torque fluctuation amount is relatively small. The torque fluctuation amount is a difference between torques respectively generated by the cylinders. The degree of the imbalance abnormality is a degree of variation in air-fuel ratios in respective combustion chambers of the cylinders at a time when the fuel injection valve is operated such that the air-fuel ratios in the respective cylinders are controlled to be equalized. The determination processing is processing for determining that the degree of the imbalance abnormality is smaller when an EGR rate is relatively large than when the EGR rate is relatively small even at the same torque fluctuation amount, the EGR rate being a value obtained by dividing the amount of exhaust flowing into the intake passage from the EGR passage by the amount of air flowing into the intake passage.

With the above-mentioned configuration, a determination is made that the degree of the imbalance abnormality is smaller in a case where the EGR rate is relatively large than in a case where the EGR rate is relatively small even at the same torque fluctuation amount. Accordingly, it is possible to determine the degree of the imbalance abnormality in view of the fact that the torque fluctuation amount becomes larger in a case where the EGR rate is relatively large than in a case where the EGR rate is relatively small even at the same degree of the imbalance abnormality. Therefore, an erroneous determination in which the degree of the imbalance abnormality is determined to be larger than the actual degree can be suppressed. Examples of the erroneous determination include determining that the imbalance abnormality is present in a case where the imbalance abnormality is absent in reality.

A second aspect of the disclosure relates to a control method for an internal combustion engine including a plurality of cylinders, a fuel injection valve for supplying a fuel to each cylinder, an EGR passage connecting an exhaust passage and an intake passage, and an EGR valve adjusting a flow rate of exhaust flowing into the intake passage from the exhaust passage via the EGR passage. The control method includes: determining, by an electronic control unit, that a degree of an imbalance abnormality is larger when a torque fluctuation amount is relatively large than when the torque fluctuation amount is relatively small; and determining, in the determination processing and by the electronic control unit, that the degree of the imbalance abnormality is smaller when an EGR rate is relatively large than when the EGR rate is relatively small even at the same torque fluctuation amount. The EGR rate is a value obtained by dividing the amount of exhaust flowing into the intake passage from the EGR passage by the amount of air flowing into the intake passage. The torque fluctuation amount is a difference between torques respectively generated by the cylinders. The degree of the imbalance abnormality is a degree of variation in air-fuel ratios in respective combustion chambers of the cylinders at a time when the fuel injection valve is operated such that the air-fuel ratios in the respective cylinders are controlled to be equalized.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a controller for an internal combustion engine will be described with reference to accompanying drawings.

Figure 1:
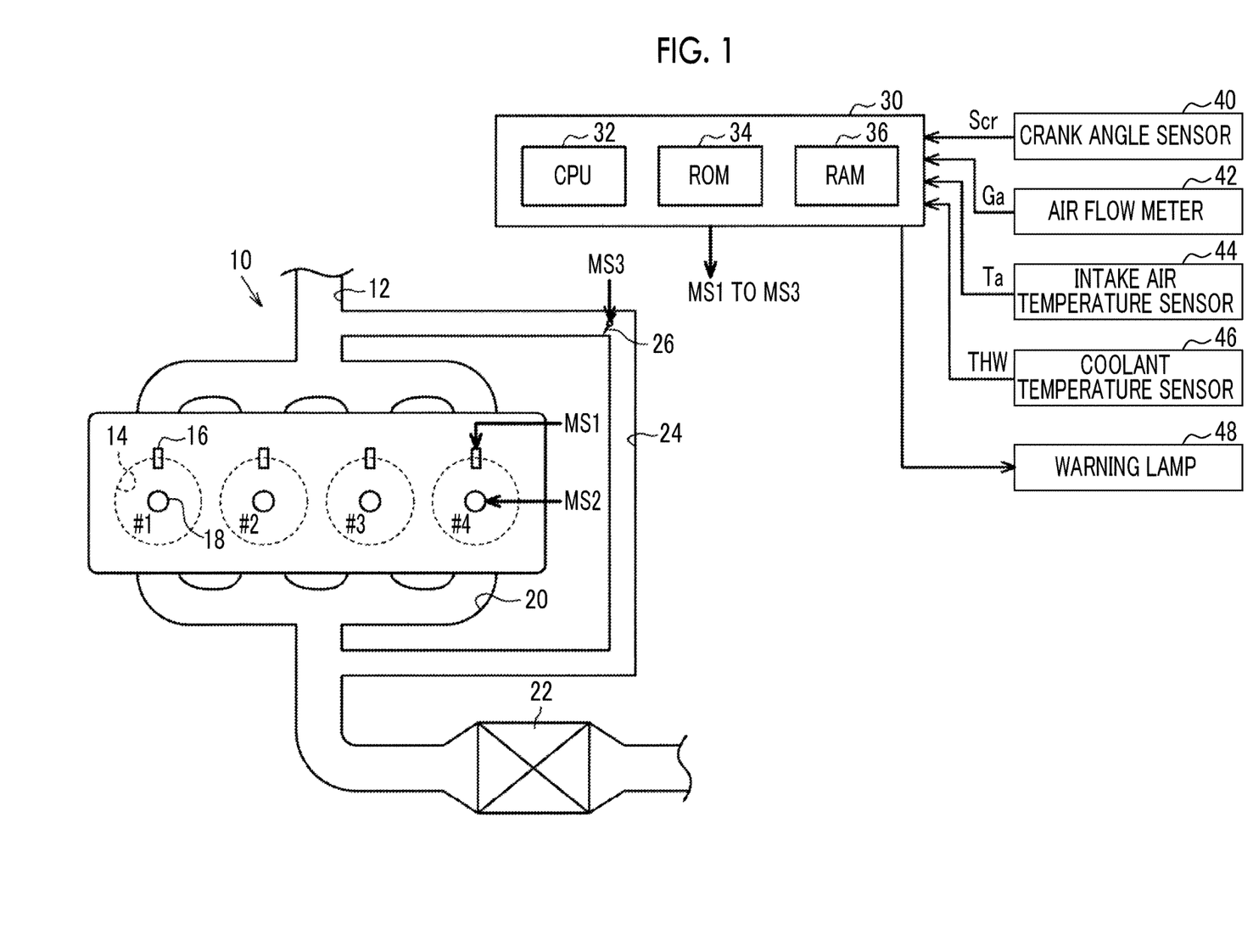
FIG. 1 is a diagram illustrating a controller and an internal combustion engine according to a first embodiment.

An internal combustion engine 10 illustrated in FIG. 1 is mounted in a vehicle. In the internal combustion engine 10, air suctioned from an intake passage 12 flows into a combustion chamber 14 of each cylinder. Each of cylinders #1 to #4 is provided with a fuel injection valve 16 injecting a fuel and an ignition device 18 generating spark discharge. In the combustion chamber 14, an air-fuel mixture in which air and a fuel are mixed with each other is used for combustion. The air-fuel mixture used for the combustion is discharged to an exhaust passage 20 as exhaust. The exhaust passage 20 is provided with a three-way catalyst 22 that has an oxygen occlusion capacity.

The exhaust passage 20 and the intake passage 12 are connected by an EGR passage 24. The EGR passage 24 is provided with an EGR valve 26 adjusting the flow path sectional area of the EGR passage 24. An electronic control unit 30 controls the internal combustion engine 10. In order to control the control amounts (torque, exhaust component, and so on) of the internal combustion engine 10, the electronic control unit 30 operates the operation units of the internal combustion engine 10 such as the fuel injection valve 16, the ignition device 18, and the EGR valve 26. In this case, the electronic control unit 30 refers to an output signal Scr of a crank angle sensor 40, an intake air amount Ga detected by an air flow meter 42, an intake air temperature Ta detected by an intake air temperature sensor 44, and the temperature of a coolant for the internal combustion engine 10 (coolant temperature THW) detected by a coolant temperature sensor 46. The electronic control unit 30 is provided with a central processing unit (CPU) 32, a read only memory (ROM) 34, and a random access memory (RAM) 36. The electronic control unit 30 executes the control of the control amounts by the CPU 32 executing a program stored in the ROM 34.

Figure 2:
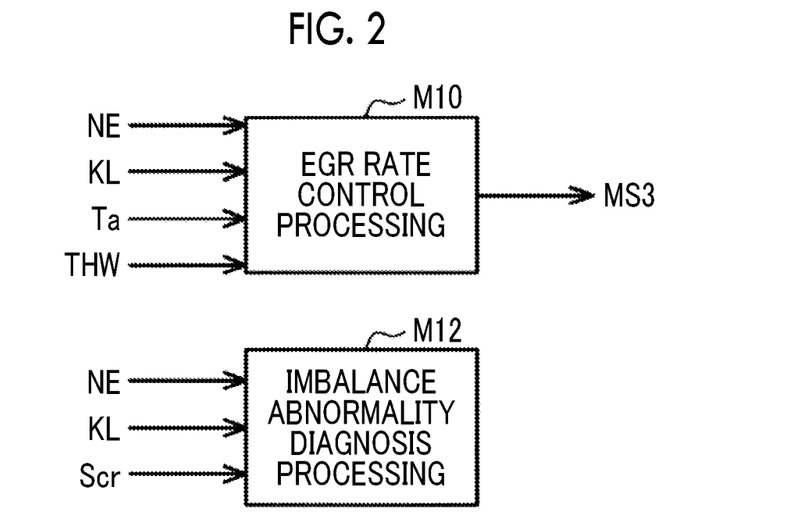
FIG. 2 is a block diagram illustrating a part of processing executed by the controller according to the first embodiment.
Figure 3A:
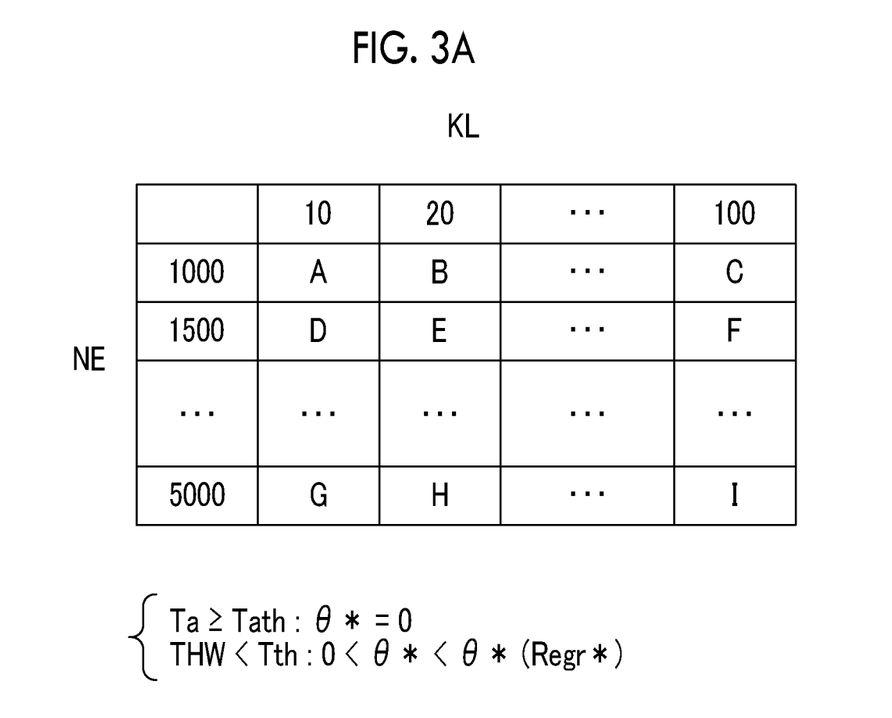
FIG. 3A is a table relating to target EGR rate and opening degree command value setting based on EGR control processing according to the first embodiment.
Figure 3B:
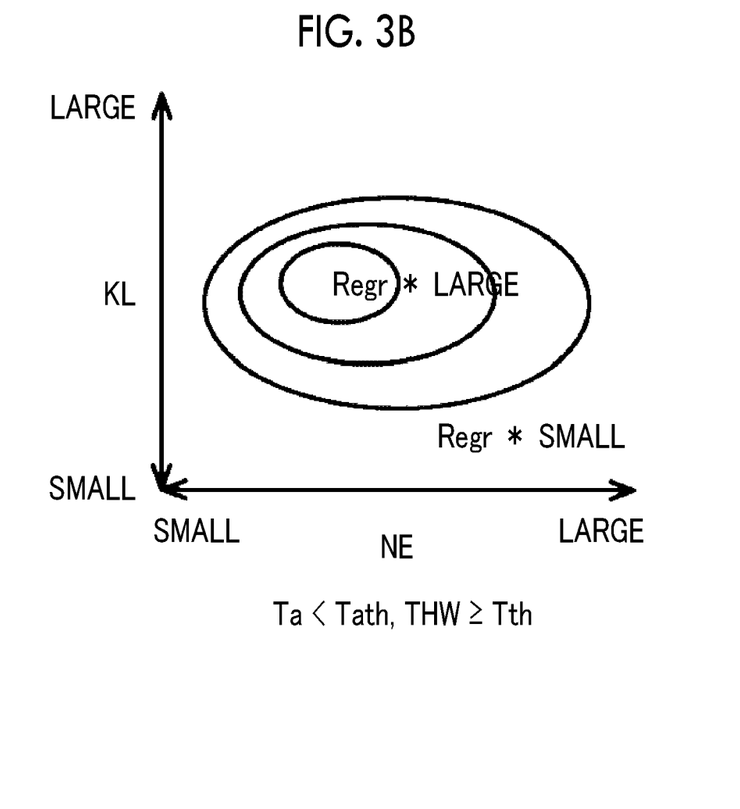
FIG. 3B is a graph relating to the target EGR rate and opening degree command value setting based on the EGR control processing according to the first embodiment.

FIG. 2 is a diagram illustrating a part of processing realized by the CPU 32 executing the program stored in the ROM 34. EGR rate control processing M10 is processing for outputting an operation signal MS3 to the EGR valve 26 so as to operate an opening degree θ of the EGR valve 26 based on a rotation speed NE, a load factor KL, the intake air temperature Ta, and the coolant temperature THW. Specifically, the EGR rate control processing M10 includes processing for setting an opening degree command value θ* of the EGR valve 26 for open loop control of an actual EGR rate Regr to a target EGR rate Regr* that depends on the rotation speed NE and the load factor KL defining an operation point of the internal combustion engine 10 and generating the operation signal MS3 such that the opening degree θ of the EGR valve 26 becomes the opening degree command value θ*. In other words, in the present embodiment, the opening degree command value θ* is determined in accordance with the rotation speed NE and the load factor KL and the target EGR rate Regr* is determined from the opening degree command value θ*. In other words, the CPU 32 does not handle the target EGR rate Regr* as a calculation parameter in reality. The processing for setting the opening degree command value θ* in accordance with the rotation speed NE and the load factor KL is processing in which the CPU 32 map-operates the opening degree command value θ* with the ROM 34 storing map data in which the rotation speed NE and the load factor KL are input variables and the opening degree command value θ* is an output variable. An example of the map data is illustrated in FIG. 3A. Illustrated in FIG. 3B are three lines where the target EGR rate Regr* defined by the map data is equal in value. In the present embodiment, the target EGR rate Regr* is set to a value as large as possible within a range in which no misfire occurs for fuel consumption amount reduction.

The map data is set data of the discrete values of input variables and the values of output variables respectively corresponding to the input variable values. For example, the map operation may be processing for using a corresponding map data output variable value as a calculation result in a case where an input variable value matches any one of the values of the input variables of the map data, and using, as a calculation result, a value obtained by interpolation of a plurality of output variable values included in the map data otherwise.

The EGR rate Regr is a value obtained by dividing the amount of exhaust flowing into the intake passage 12 from the exhaust passage 20 via the EGR passage 24 (EGR amount) by the intake air amount Ga. The rotation speed NE is calculated by the CPU 32 based on the output signal Scr of the crank angle sensor 40. The load factor KL is a parameter indicating the amount of air with which the combustion chamber 14 is filled and is calculated by the CPU 32 based on the intake air amount Ga. The load factor KL is the ratio of the inflow air amount per combustion cycle of one cylinder to a reference inflow air amount. The reference inflow air amount may be an amount variably set in accordance with the rotation speed NE.

As illustrated in FIG. 3A, the EGR rate control processing M10 includes processing for turning the opening degree command value θ* of the EGR valve 26 into zero for knocking avoidance, without adopting the opening degree command value θ* determined based on the map operation, in a case where the intake air temperature Ta becomes equal to or higher than a predetermined temperature Tath. In a case where the coolant temperature THW is lower than a specified temperature Tth, the EGR rate control processing M10 executes processing in which the opening degree command value θ* is turned into a value between the opening degree command value θ* corresponding to the target EGR rate Regr* and zero and allowed to approach the opening degree command value θ* corresponding to the target EGR rate Regr* as the coolant temperature THW rises.

Referring back to FIG. 2, imbalance abnormality diagnosis processing M12 is alarm processing in which the presence or absence of an imbalance abnormality is diagnosed based on the output signal Scr, the rotation speed NE, and the load factor KL, the imbalance abnormality is diagnosed to be present in a case where the degree of the imbalance abnormality is relatively large, and then a warning lamp 48 illustrated in FIG. 1 is operated to prompt a user of the vehicle to have the vehicle repaired in a repair shop. The imbalance abnormality means the air-fuel ratio of a certain cylinder being shifted to the lean side with respect to the following same value in a case where each of the fuel injection valves 16 of the cylinders #1 to #4 is operated such that the air-fuel ratios of the air-fuel mixtures in all of the cylinders #1 to #4 are controlled to the same value.

Figure 4:
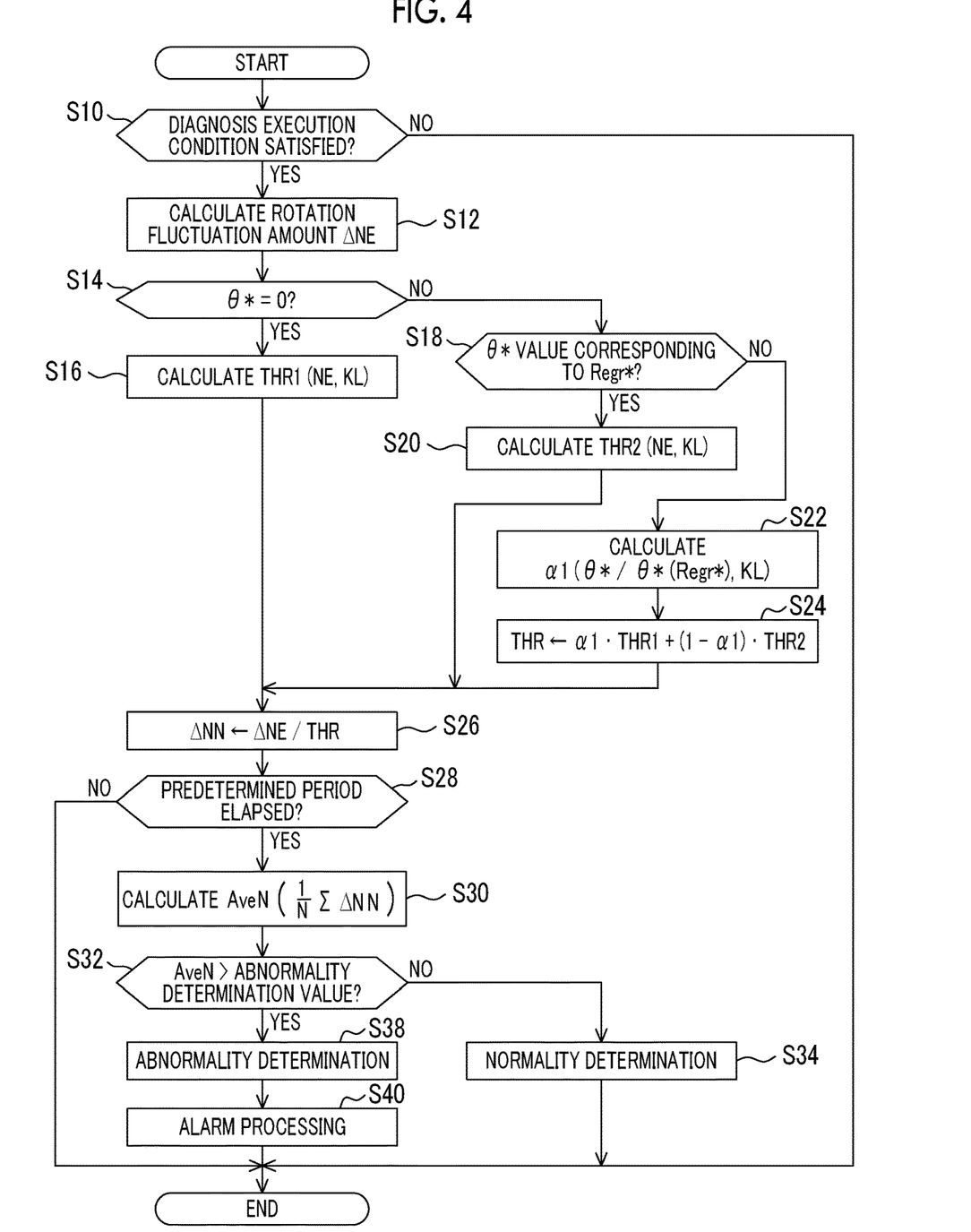
FIG. 4 is a flowchart illustrating the procedure of imbalance abnormality diagnosis processing according to the first embodiment.

Illustrated in FIG. 4 is the procedure of the imbalance abnormality diagnosis processing M12. The processing that is illustrated in FIG. 4 is realized by the CPU 32 repeatedly executing the program stored in the ROM 34 at, for example, a predetermined cycle. In the following description, numbers starting with "S" represent step numbers.

In the sequential processing that is illustrated in FIG. 4, the CPU 32 first determines whether or not an execution condition for the diagnosis of the presence or absence of the imbalance abnormality is satisfied (S10). Examples of the diagnosis execution condition include the rotation speed NE and the load factor KL falling within a predetermined range. The condition is to execute the diagnosis in a region where the accuracy of the diagnosis can be enhanced.

In a case where the CPU 32 determines that the diagnosis execution condition is satisfied (S10: YES), the CPU 32 calculates a rotation fluctuation amount $\Delta NE$ (S12) as the magnitude of the difference between instantaneous speeds $\omega$ of a pair of the cylinders time-sequentially adjacent among the instantaneous speeds $\omega$, which are rotation speeds in a 30° rotation angle region including the TDCs of the respective cylinders #1 to #4 calculated from the output signal Scr. The rotation fluctuation amount $\Delta NE$ is a parameter correlating with the imbalance abnormality.

Figure 5:
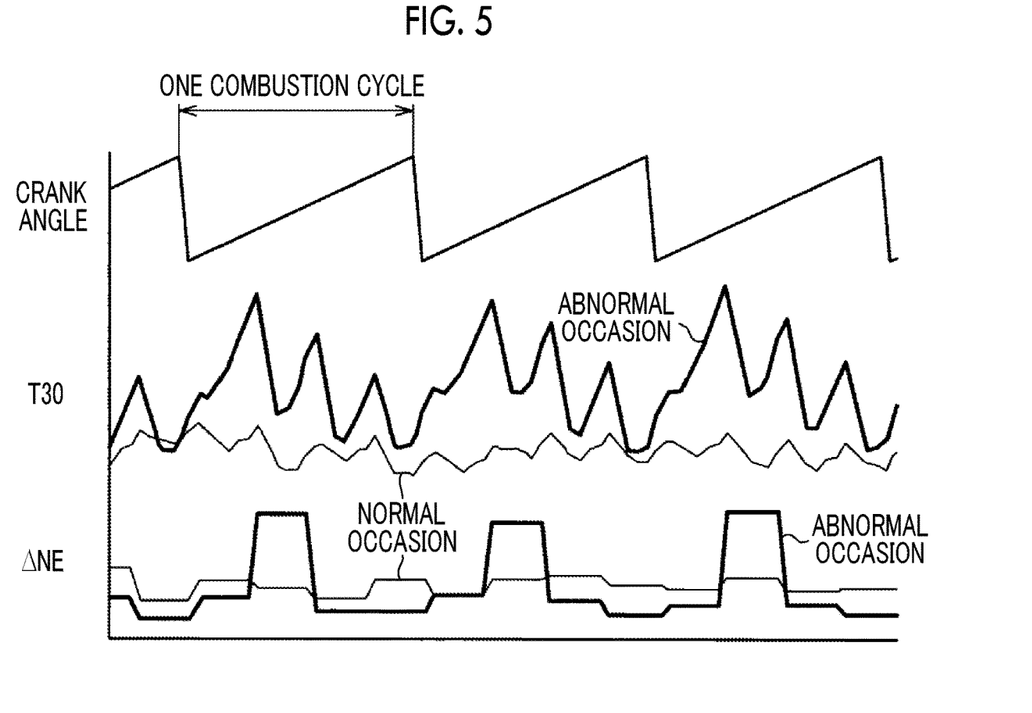
FIG. 5 is a time chart illustrating a rotation fluctuation amount depending on the presence or absence of an imbalance abnormality.

Illustrated in FIG. 5 are the transition of time T30 needed for a 30-degree rotation of a crankshaft and the transition of the rotation fluctuation amount $\Delta NE$ depending on the presence or absence of the imbalance abnormality. As illustrated in FIG. 5, the value of the rotation fluctuation amount $\Delta NE$ is larger in a case where the imbalance abnormality has occurred than in a case where the imbalance abnormality has not occurred.

Referring back to FIG. 4, the CPU 32 determines whether or not the opening degree command value $\theta^*$ is zero (S14). The above processing is processing for determining whether or not the EGR rate Regr is in a state of not being controlled to the target EGR rate Regr* determined from the map data illustrated in FIGS. 3A and 3B because the intake air temperature Ta is equal to or higher than the predetermined temperature Tath. In a case where the CPU 32 determines that the opening degree command value $\theta^*$ is zero (S14: YES), the CPU 32 calculates a first determination threshold THR1 (S16) based on the rotation speed NE and the load factor KL. The first determination threshold THR1 indicates the value of the rotation fluctuation amount $\Delta NE$ on a normal occasion when the imbalance abnormality is absent and the EGR rate Regr is zero. The above processing can be realized by the CPU 32 map-operating the first determination threshold THR1 with the ROM 34 storing map data in which the rotation speed NE and the load factor KL are input variables and the first determination threshold THR1 is an output variable.

In a case where the opening degree command value $\theta^*$ is not zero (S14: NO), the CPU 32 determines whether or not the opening degree command value $\theta^*$ is a value corresponding to the target EGR rate Regr* determined from the map data illustrated in FIGS. 3A and 3B (S18). The above processing is because the opening degree command value $\theta^*$ may not be a value corresponding to the target EGR rate Regr* determined from the map data illustrated in FIGS. 3A and 3B with the coolant temperature THW lower than the specified temperature Tth. In a case where the CPU 32 determines that opening degree command value $\theta^*$ is a value corresponding to the target EGR rate Regr* determined from the map data illustrated in FIGS. 3A and 3B (S18: YES), the CPU 32 calculates a second determination threshold THR2 (S20) based on the rotation speed NE and the load factor KL. The second determination threshold THR2 indicates the value of the rotation fluctuation amount $\Delta NE$ on a normal occasion when the imbalance abnormality is absent with the EGR rate Regr controlled to the target EGR rate Regr*. In the present embodiment, the second determination threshold THR2 is set to a value exceeding the first determination threshold THR1 in a case where the rotation speed NE and the load factor KL are the same. The setting to a value exceeding the first determination threshold THR1 is in view of the rotation fluctuation amount $\Delta NE$ being larger in a case where the EGR rate Regr is relatively large than in a case where the EGR rate Regr is relatively small even at the same degree of imbalance abnormality. The above processing can be realized by the CPU 32 map-operating the second determination threshold THR2 with the ROM 34 storing map data in which the rotation speed NE and the load factor KL are input variables and the second determination threshold THR2 is an output variable.

In a case where the CPU 32 determines that opening degree command value $\theta^*$ is not a value corresponding to the target EGR rate Regr* determined from the map data illustrated in FIGS. 3A and 3B (S18: NO), the CPU 32 calculates a weighting factor $\alpha 1$ (S22) based on the load factor KL and "$\theta^*/\theta^*(Regr^*)$", which is a value obtained by dividing the current opening degree command value $\theta^*$ by the opening degree command value $\theta^*$ corresponding to the target EGR rate Regr*. As described above, in the present embodiment, the target EGR rate Regr* is not a calculation parameter handled by the CPU 32, and thus "$\theta^*/\theta^*(Regr^*)$" obtained by the division is equivalent to "Regr/Regr*", which is a value obtained by dividing the actual EGR rate Regr by the target EGR rate Regr*. The above processing can be realized by the CPU 32 map-operating the weighting factor $\alpha 1$ with the ROM 34 storing map data in which the value obtained by the division and the load factor KL are input variables and the weighting factor $\alpha 1$ is an output variable.

The CPU 32 calculates the first determination threshold THR1 and the second determination threshold THR2 and substitutes the sum of a value obtained by multiplying the first determination threshold THR1 by the weighting factor $\alpha 1$ and a value obtained by multiplying the second determination threshold THR2 by "$1-\alpha 1$" for a determination threshold THR (S24). The above processing is processing for calculating an appropriate determination threshold THR in a case where the EGR rate Regr is controlled to a value exceeding zero and exceeded by the target EGR rate Regr*. The EGR amount is not necessarily proportional to the opening degree $\theta$ of the EGR valve 26, and thus it may be impossible to maintain the accuracy of the weighting factor $\alpha 1$ in a case where the weighting factor $\alpha 1$ is calculated solely from "$\theta^*/\theta^*(Regr^*)$" obtained by the division. In a case where the weighting factor $\alpha 1$ is set based on the rotation speed NE and the load factor KL, which are parameters for grasping the target EGR rate Regr*, in addition to "θ*/θ*(Regr*)" obtained by the division, the number of data of the map data and adaptive man-hours increase. As is apparent from the lines in FIGS. 3A and 3B where the target EGR rate Regr* is equal in value, in the present embodiment, the load factor KL is used in addition to "θ*/θ*(Regr*)" obtained by the division in view of the fact that the target EGR rate Regr* significantly changes with respect to a change in the load factor KL rather than the rotation speed NE.

In a case where the processing of S16, S20, and S24 is completed, the CPU 32 substitutes a value obtained by dividing the rotation fluctuation amount ΔNE by the determination threshold THR for a comparison parameter ΔNN (S26). The CPU 32 determines whether or not a predetermined period has elapsed that has a length allowing the comparison parameter ΔNN to be sampled a plurality of times (S28). In a case where the CPU 32 determines that the predetermined period has elapsed (S28: YES), the CPU 32 calculates an average value AveN of the comparison parameters ΔNN calculated within the predetermined period (S30). The CPU 32 determines whether or not the average value AveN exceeds an abnormality determination value (S32). The above processing is processing for determining whether or not the rotation fluctuation amount ΔNE exceeds the determination threshold THR by a predetermined margin or more. In other words, at an abnormality determination value of "1", for example, the average value of the rotation fluctuation amount ΔNE exceeds the abnormality determination value in a case where the average value of the rotation fluctuation amount ΔNE exceeds the average value of the determination threshold THR, and this means the rotation fluctuation amount ΔNE may have exceeded the determination threshold THR. At an abnormality determination value of "1.2", for example, the average value of the rotation fluctuation amount ΔNE exceeds the abnormality determination value in a case where the average value of the rotation fluctuation amount ΔNE is equal to or greater than "1.2" times the average value of the determination threshold THR, and this means the rotation fluctuation amount ΔNE may have increased to at least "1.2" times the determination threshold THR.

In a case where the CPU 32 determines that the average value AveN is equal to or less than the abnormality determination value (S32: NO), the CPU 32 determines that the abnormality is absent (S34). In a case where the CPU 32 determines that the average value AveN exceeds the abnormality determination value (S32: YES), the CPU 32 determines that the abnormality is present (S38) and executes the alarm processing described above (S40).

In a case where the processing of S34 and S40 is completed and in a case where a negative determination is made in the processing of S10 and S28, the CPU 32 temporarily terminates the sequential processing illustrated in FIG. 4. The action and effect of the present embodiment will be described below.

Figure 6:
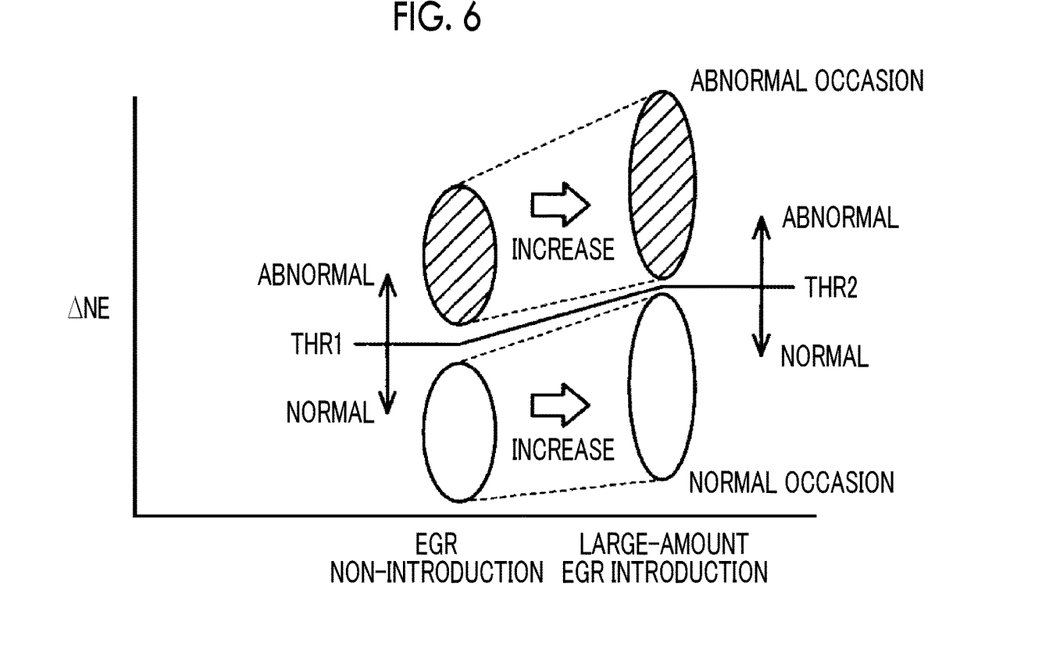
FIG. 6 is a diagram illustrating an effect relating to the first embodiment.

In a case where the EGR valve 26 is closed, the CPU 32 determines whether or not the rotation fluctuation amount ΔNE exceeds the first determination threshold THR1 by a predetermined margin or more as illustrated in FIG. 6. In a case where the EGR rate Regr is controlled to the target EGR rate Regr* determined by the map data illustrated in FIGS. 3A and 3B, the CPU 32 determines whether or not the rotation fluctuation amount ΔNE exceeds, by a predetermined margin or more, the second determination threshold THR2 determined based on the rotation fluctuation amount ΔNE on a normal occasion on the premise that the above control is performed as illustrated in FIG. 6. The second determination threshold THR2 is set to a value exceeding the first determination threshold THR1. As a result, an erroneous determination in the absence of the imbalance abnormality can be suppressed that the rotation fluctuation amount ΔNE exceeds the determination threshold THR by a predetermined margin or more and the imbalance abnormality is present in a case where the EGR rate Regr is controlled to the target EGR rate Regr* determined by the map data illustrated in FIGS. 3A and 3B.

According to the present embodiment described above, the following effects can be further obtained.

(1) The determination threshold THR is variably set in accordance with the load factor KL and the rotation speed NE of the crankshaft of the internal combustion engine 10. As a result, the dependence of the magnitude of the rotation fluctuation amount ΔNE on the rotation speed NE and the load factor KL, as well as the degree of the imbalance abnormality, can be taken into account. Accordingly, whether or not the degree of the imbalance abnormality is large can be more accurately determined than in a case where the variable setting is not performed.

(2) Whether or not the rotation fluctuation amount ΔNE exceeds the determination threshold THR by a predetermined margin or more is determined based on the magnitude of the average value AveN. By the average value AveN being used as described above, resistance to noise of the determination processing for determining whether or not the degree of the imbalance abnormality is large can be enhanced compared to a case where the magnitudes of the single rotation fluctuation amount ΔNE and the determination threshold THR are compared.

(3) In a case where the opening degree θ of the EGR valve 26 is controlled to a value between zero and a value corresponding to the target EGR rate Regr*, the determination threshold THR is turned into a weighted moving average processing value of the first determination threshold THR1 and the second determination threshold THR2 and the weighting factor α1 is calculated based on the load factor KL and "θ*/θ*(Regr*)" obtained by the division. As a result, adaptive man-hours can be reduced compared to a case where the weighting factor α1 is calculated based on "θ*/θ*(Regr*)" obtained by the division, the rotation speed NE, and the load factor KL.

Second Embodiment

Hereinafter, a second embodiment will be described with reference to accompanying drawings. The following description will focus on differences from the first embodiment.

In the present embodiment, the determination threshold THR in the processing of S26 is turned into the rotation fluctuation amount ΔNE in an imbalance abnormality-absent case during control to the target EGR rate Regr* determined by the map data illustrated in FIGS. 3A and 3B, and the rotation fluctuation amount ΔNE is corrected during non-control to the target EGR rate Regr* determined by the map data illustrated in FIGS. 3A and 3B.

Figure 7:
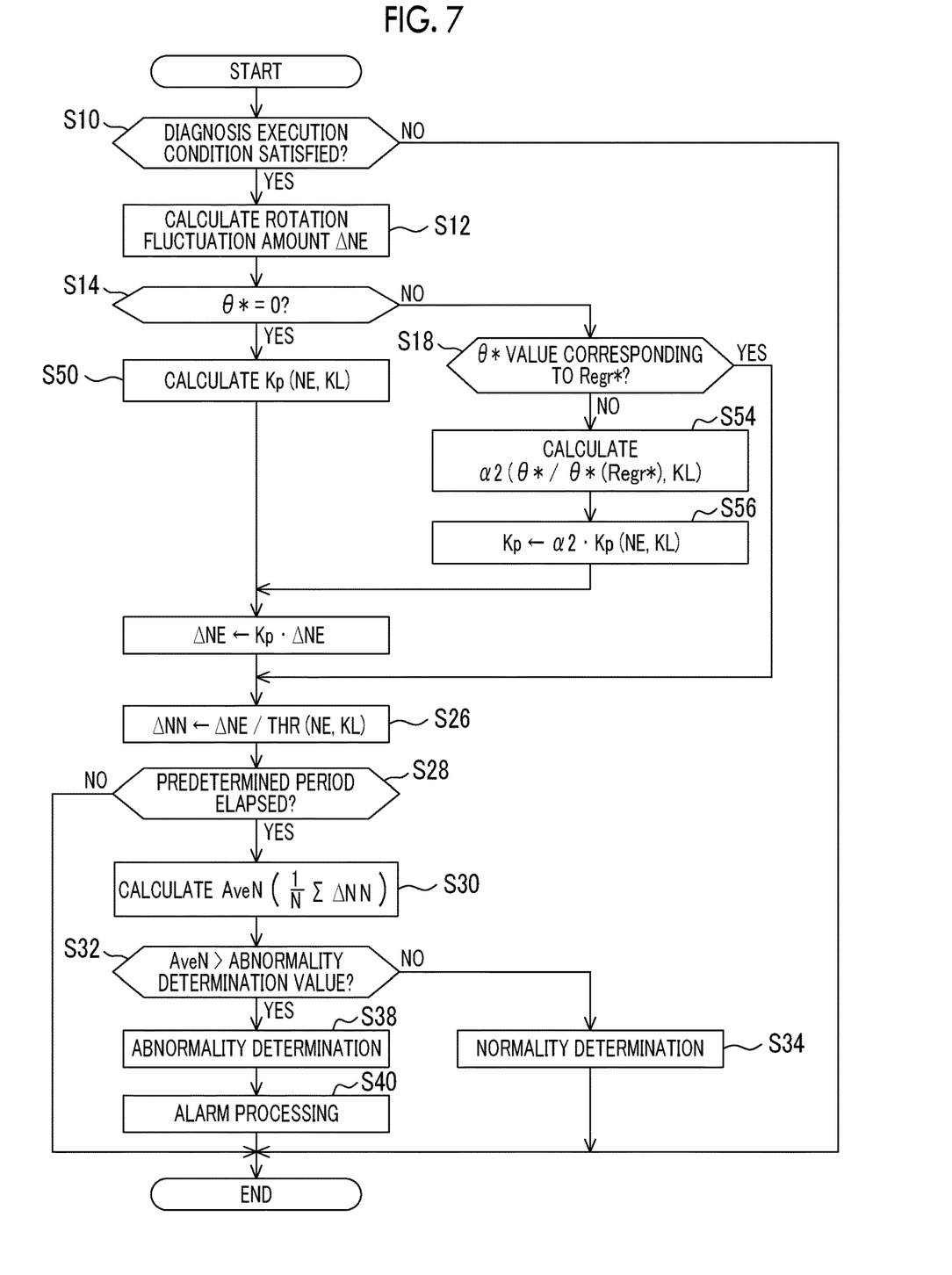
FIG. 7 is a flowchart illustrating the procedure of imbalance abnormality diagnosis processing according to a second embodiment.

Illustrated in FIG. 7 is the procedure of the imbalance abnormality diagnosis processing M12 according to the present embodiment. The processing that is illustrated in FIG. 7 is realized by the CPU 32 repeatedly executing the program stored in the ROM 34 at, for example, a predetermined cycle. For convenience, in FIG. 7, the same step numbers are given to processing corresponding to the processing illustrated in FIG. 4.

In the sequential processing that is illustrated in FIG. 7, the CPU 32 calculates an increase correction factor Kp of the rotation fluctuation amount ΔNE (S50) in accordance with the rotation speed NE and the load factor KL in a case where the opening degree command value θ* is zero (S14: YES). The rotation speed NE and the load factor KL are parameters for specifying the target EGR rate Regr* determined by the map data illustrated in FIGS. 3A and 3B. The increase correction factor Kp is set to a value exceeding "1" in view of the fact that the rotation fluctuation amount ΔNE is larger when the EGR rate Regr is controlled to the target EGR rate Regr* determined by the map data illustrated in FIGS. 3A and 3B than when the EGR valve 26 is closed.

In the case of a negative determination in the processing of S18, the CPU 32 calculates a weighting factor α2 (S54) based on the load factor KL and "θ*/θ*(Regr*)" obtained by dividing the current opening degree command value θ* by the opening degree command value θ* corresponding to the target EGR rate Regr*. Details of the above processing are similar to the weighting factor α1 calculation processing. After calculating the increase correction factor Kp in the same manner as the processing of S50, the CPU 32 substitutes a value obtained by multiplying the increase correction factor Kp by the weighting factor α2 for the increase correction factor Kp (S56). In a case where the processing of S50 and S56 is completed, the CPU 32 substitutes a value obtained by multiplying the rotation fluctuation amount ΔNE by the increase correction factor Kp for the rotation fluctuation amount ΔNE (S52).

In a case where the processing of S52 is completed and in a case where a positive determination is made in the processing of S18, the CPU 32 proceeds to the processing of S26. The processing of S12 to S38 in FIG. 4 and the processing of S12, S14, S18, S50 to S56, and S26 to S38 in FIG. 7 are examples of determination processing. The processing of S26 to S32 is an example of comparison determination processing. The processing of S14 to S24 in FIG. 4 is an example of EGR rate reflection processing. The processing of S26 to S32 is an example of the comparison determination processing. The processing of S18 and S50 to S56 in FIG. 7 is an example of the EGR rate reflection processing. Both the processing of S16 and the processing of S20 in FIG. 4 are examples of threshold variable processing. In other words, reflection of the dependence on the EGR rate is possible solely by merely one of S16 and S20 being variably set in accordance with the rotation speed NE and the load factor KL, and variable setting in accordance with both is to reflect the degree of dependence on the rotation speed NE and the load factor KL apart from the EGR rate Regr. In FIG. 7, the processing of S26 is an example of the threshold variable processing. The processing of S28 to S30 is an example of average value calculation processing. The processing of S32 is an example of abnormality determination processing.

Other Embodiments

The present embodiment can be implemented with the following modifications. The present embodiment and the following modifications can be implemented in combination with each other within a range entailing no technical contradiction.

Regarding Torque Fluctuation Amount

For example, the rotation angle region that is used for the calculation of the instantaneous speed ω may include no TDC and may be, for example, the speed of a 60° CA rotation angle region without having to be limited to, for example, the speed of the 30° CA rotation angle region. Still, it is desirable that a period is included in which the rotation speed of the crankshaft reaches a maximum as a result of the combustion stroke of each cylinder.

Although the torque fluctuation amount is quantified by the rotation fluctuation amount ΔNE in the embodiment described above, the disclosure is not limited thereto. For example, a torque fluctuation amount in which the torque difference of the cylinders #1 to #4 is quantified may be calculated by each of the cylinders #1 to #4 being provided with an in-cylinder pressure sensor detecting the pressure in the combustion chamber 14, the heat generation rate of each cylinder being calculated based on time series data of a detection value of the in-cylinder pressure sensor, and torque calculation being performed based on the calculated heat generation rate.

Regarding Comparison Determination Processing

In the embodiment described above, whether or not the rotation fluctuation amount ΔNE exceeds the determination threshold THR by a predetermined margin or more is determined by comparison between the magnitudes of the abnormality determination value and the average value AveN of the comparison parameters ΔNN within a predetermined period, the comparison parameter ΔNN being a value obtained by dividing the rotation fluctuation amount ΔNE by the determination threshold THR of each time. The disclosure is not limited thereto. For example, whether or not the rotation fluctuation amount ΔNE exceeds the determination threshold THR by a predetermined margin or more may be determined by comparison between the magnitudes of the abnormality determination value and one comparison parameter ΔNN. In this case, the alarm processing may be executed such that, for example, a temporary abnormality determination is made in the event of a determination that the rotation fluctuation amount ΔNE exceeds the determination threshold THR by a predetermined margin or more and a determination that the imbalance abnormality is present is made in a case where the number of the temporary abnormality determinations within a predetermined period becomes equal to or greater than a predetermined value.

For example, the rotation fluctuation amount ΔNE, for example, may be corrected in accordance with a load in a case where the determination threshold THR is not variably set in accordance with the rotation speed NE and a load. The correction as described above can be realized by, for example, processing for multiplying the rotation fluctuation amount ΔNE by a correction factor reflecting the difference of the rotation fluctuation amount ΔNE depending on the rotation speed NE and the load factor KL being included between the processing of S12 and the processing of S14 in the processing in FIG. 7.

Regarding Threshold Variable Processing

Although the determination threshold THR is variably set in accordance with the rotation speed NE and the load factor KL in the embodiment described above, the disclosure is not limited thereto. For example, as a load of the internal combustion engine 10, the load factor KL may be replaced with the in-cylinder filling air amount itself or an injection amount determined in accordance with the in-cylinder filling air amount for air-fuel ratio control to a target air-fuel ratio.

The variable setting of the determination threshold THR in accordance with the rotation speed NE and a load is optional itself.

Regarding EGR Rate Reflection Processing

In the processing of S16 in FIG. 4, the first determination threshold THR1 is calculated based on the rotation speed NE and the load factor KL. The disclosure is not limited thereto.

For example, processing for calculating the target EGR rate Regr* every time may be executed for a decrease correction factor Kd to be calculated based on the target EGR rate Regr* and the first determination threshold THR1 to be "Kd·THR2". In this case, the processing of S24 is replaced with processing for substituting "(α1·Kd+1−α1)·THR2" for the determination threshold THR. For example, processing for calculating the target EGR rate Regr* every time may be executed for the processing of S18 to S24 to be replaced with processing for calculating the determination threshold THR in accordance with the rotation speed NE, the load factor KL, and the target EGR rate Regr*.

In the processing of S22 in FIG. 4, the weighting factor α1 is calculated based on the load factor KL and "θ*/θ*(Regr*)" obtained by dividing the current opening degree command value θ* by the opening degree command value θ* corresponding to the target EGR rate Regr*. The disclosure is not limited thereto. For example, the calculation may be based solely on "θ*/θ*(Regr*)" obtained by the division. For example, the calculation may be based on "θ*/θ*(Regr*)" obtained by the division, the load factor KL, and the rotation speed NE.

In the processing of S54 in FIG. 7, the weighting factor α2 is calculated based on the load factor KL and "θ*/θ*(Regr*)" obtained by dividing the current opening degree command value θ* by the opening degree command value θ* corresponding to the target EGR rate Regr*. The disclosure is not limited thereto. For example, the calculation may be based solely on "θ*/θ*(Regr*)" obtained by the division. For example, the calculation may be based on "θ*/θ*(Regr*)" obtained by the division, the load factor KL, and the rotation speed NE.

In the processing of S50 in FIG. 7, the increase correction factor Kp is calculated based on the rotation speed NE and the load factor KL. The disclosure is not limited thereto. For example, processing for calculating the target EGR rate Regr* every time may be executed for the increase correction factor Kp to be calculated based on the target EGR rate Regr*. For example, processing for calculating the target EGR rate Regr* every time may be executed for the processing of S14, S18, S50, S54, and S56 to be replaced with processing for setting the increase correction factor Kp based on the load factor KL and "θ*/θ*(Regr*)" obtained by dividing the current opening degree command value θ* by the opening degree command value θ* corresponding to the target EGR rate Regr*.

In FIG. 7, the determination threshold THR used in the processing of S26 may be set based on the value of the rotation fluctuation amount ΔNE pertaining to a case where the EGR valve 26 is closed and the imbalance abnormality is absent. In this case, the rotation fluctuation amount ΔNE may be corrected with the increase correction factor Kp based on the load factor KL, the rotation speed NE, and "θ*/θ*(Regr*)" obtained by dividing the current opening degree command value θ* by the opening degree command value θ* corresponding to the target EGR rate Regr* in a case where the opening degree command value θ* exceeds zero.

Regarding Determination Processing

In the embodiment described above, a determination is made on whether or not the degree of the imbalance abnormality is large to the point of needing the alarm processing. The disclosure is not limited thereto. For example, a plurality of stages or a continuous degree may be determined with regard to the degree of an imbalance abnormality at a level needing no alarm processing. This may be processing in which, for example, the magnitude of the determination threshold THR is set to a standard value pertaining to an imbalance abnormality-absent case and a determination is made that the degree of the imbalance abnormality is larger in a case where the degree to which the rotation fluctuation amount ΔNE exceeds the determination threshold THR is relatively large than in a case where the degree to which the rotation fluctuation amount ΔNE exceeds the determination threshold THR is relatively small. In this case, it is desirable that an electrically rewritable nonvolatile memory is provided in the electronic control unit 30 and the degree of the imbalance abnormality is stored and updated as a learning value in the nonvolatile memory. The learning value may be used in, for example, processing for calculating an increase correction amount for an injection amount with respect to a cylinder leaner in air-fuel ratio than another cylinder so that a misfire is suppressed when the internal combustion engine 10 is started.

Regarding EGR Rate Control Processing

In the embodiment described above, the opening degree θ of the EGR valve 26 is operated for the open loop control of the EGR rate Regr to the target EGR rate Regr* in accordance with the rotation speed NE and the load factor KL. The disclosure is not limited thereto. For example, the target EGR rate Regr* may be set in accordance with the rotation speed NE and the load factor KL and the intake passage 12 may be provided with a pressure sensor such that the EGR rate Regr is calculated based on, for example, a detection value of the pressure sensor and the opening degree θ of the EGR valve 26 is operated for feedback control of the EGR rate Regr to the target EGR rate Regr*.

In the embodiment described above, processing for forcibly turning the target EGR rate Regr* into zero without following the target EGR rate Regr* determined in accordance with the rotation speed NE and the load factor KL is executed in a case where the intake air temperature Ta is high. The disclosure is not limited thereto. For example, the processing for forcibly turning the target EGR rate Regr* into zero may be executed in a case where the temperature of the coolant for the internal combustion engine 10 is equal to or lower than a predetermined temperature. In the internal combustion engine 10 that is provided with a canister collecting the fuel vapor in a fuel tank, for example, the processing for forcibly turning the target EGR rate Regr* into zero may be executed in a case where a purge rate obtained by dividing the flow rate of the fuel vapor flowing into the intake passage 12 from the canister by the intake air amount Ga is equal to or higher than a predetermined ratio.

Also possible is control to any of zero and the target EGR rate Regr* exceeding zero and set in accordance with the rotation speed NE and the load factor KL.

Regarding Alarm Processing

In the embodiment described above, processing for operating a visual information output device (warning lamp 48) has been exemplified as the alarm processing for abnormality presence alarm. The disclosure is not limited thereto. For example, the alarm processing may also be processing for operating a device outputting auditory information such as a warning sound. In other words, the alarm device may be any device that outputs at least one of visual information and auditory information.

Regarding Controller

The controller is not limited to the electronic control unit provided with the CPU 32 and the ROM 34 and executing software processing. For example, a dedicated hardware circuit (such as ASIC) may be provided that hardware-processes at least a part of what is software-processed in the embodiment described above. In other words, the controller may have any of the following configurations (a) to (c). (a) Being provided with a processing device executing the whole of the above processing in accordance with a program and a program-storing program storage device such as a ROM. (b) Being provided with a processing device and a program storage device executing a part of the above processing in accordance with a program and a dedicated hardware circuit executing the rest of the processing. (c) Being provided with a dedicated hardware circuit executing the whole of the above processing. A plurality of the dedicated hardware circuits and the software processing circuits provided with the processing device and the program storage device may be provided. In other words, the above processing may be executed by a processing circuit provided with at least one of one or a plurality of software processing circuits and one or a plurality of dedicated hardware circuits.

Regarding Internal Combustion Engine

The internal combustion engine is not limited to a four-cylinder internal combustion engine. For example, the internal combustion engine may also be an in-line six-cylinder internal combustion engine. The fuel injection valve is not limited to one injecting a fuel into the combustion chamber 14. For example, the fuel injection valve may also be one injecting a fuel into the intake passage 12.

In the first aspect of this disclosure, the determination processing may include comparison determination processing for determining whether or not the torque fluctuation amount exceeds a determination threshold by a predetermined margin or more and EGR rate reflection processing for setting the determination threshold to a larger value when the EGR rate is relatively large than when the EGR rate is relatively small. The electronic control unit may be configured to determine that the degree of the imbalance abnormality is large in a case where the electronic control unit determines as a result of the comparison determination processing that the torque fluctuation amount exceeds the determination threshold by the predetermined margin or more.

In the configuration described above, the determination threshold compared to the torque fluctuation amount is set to a larger value in a case where the EGR rate is relatively large than in a case where the EGR rate is relatively small in view of the fact that the torque fluctuation amount for a determination that the degree of the imbalance abnormality is large in a case where the EGR rate is relatively large exceeds the torque fluctuation amount for a determination that the degree of the imbalance abnormality is large in a case where the EGR rate is relatively small.

In the first aspect of this disclosure, the determination processing may include comparison determination processing for determining whether or not the torque fluctuation amount exceeds a determination threshold by a predetermined margin or more and EGR rate reflection processing for correcting the torque fluctuation amount compared to the determination threshold prior to the comparison determination processing such that the torque fluctuation amount becomes a smaller value when the EGR rate is relatively large than when the EGR rate is relatively small even at the same actual torque fluctuation amount. The electronic control unit may be configured to determine that the degree of the imbalance abnormality is large when the electronic control unit determines as a result of the comparison determination processing that the torque fluctuation amount exceeds the determination threshold by the predetermined margin or more.

In the configuration described above, the torque fluctuation amount compared to the determination threshold is corrected to become a smaller value in a case where the EGR rate is relatively large than in a case where the EGR rate is relatively small in view of the fact that the torque fluctuation amount for a determination that the degree of the imbalance abnormality is large in a case where the EGR rate is relatively large exceeds the torque fluctuation amount for a determination that the degree of the imbalance abnormality is large in a case where the EGR rate is small.

In the first aspect of this disclosure, the determination processing may include threshold variable processing for variably setting the determination threshold in accordance with a rotation speed of a crankshaft of the internal combustion engine and a load of the internal combustion engine.

The magnitude of the torque fluctuation amount depends on the rotation speed and the load as well as the degree of the imbalance abnormality. Accordingly, in a case where the determination threshold is a value that does not depend on the rotation speed and the load, it may be impossible to make a determination that the degree of the imbalance abnormality is large in a case where the degree of the imbalance abnormality is large, or an erroneous determination that the degree of the imbalance abnormality is large may be made in a case where the degree of the imbalance abnormality is small in reality. According to the first aspect of this disclosure, in contrast, the determination threshold is variably set in accordance with the rotation speed and the load, and thus whether or not the degree of the imbalance abnormality is large can be more accurately determined than in a case where the variable setting is not performed.

In the first aspect of this disclosure, the comparison determination processing may include average value calculation processing for calculating an average value of comparison parameters within a predetermined period, a relative magnitude relationship between the torque fluctuation amount and the determination threshold being quantified in the comparison parameter, and abnormality determination processing for determining, based on a magnitude of the average value, whether or not the torque fluctuation amount exceeds the determination threshold by a predetermined margin or more.

According to the first aspect of this disclosure, resistance to noise of the determination processing for determining whether or not the degree of the imbalance abnormality is large can be enhanced by the average value within the predetermined period being used. In a case where the average value of torque fluctuation amounts is used, a fluctuation in EGR rate, load, and the like within a predetermined period results in a fluctuation in the minimum value of the torque fluctuation amount for a determination that the degree of the imbalance abnormality is large. Accordingly, the determination accuracy may decline as a result of comparison between the determination threshold at a single timing and the average value of torque fluctuation amounts within a predetermined period. Accordingly, the above configuration that uses the average value of the comparison parameters in which the relative magnitude relationship between the torque fluctuation amount and the determination threshold is quantified instead of comparing the magnitudes of the determination threshold and the average value of torque fluctuation amounts within a predetermined period is especially effective.

In the first aspect of this disclosure, the electronic control unit may be configured to execute EGR rate control processing for controlling the EGR rate to a target EGR rate determined in accordance with an operation point of the internal combustion engine. The EGR rate control processing may include processing for controlling the EGR rate to zero and processing for controlling the EGR rate to an intermediate value between the target EGR rate and zero in addition to processing for controlling the EGR rate to the target EGR rate. The EGR rate reflection processing may include processing for calculating the determination threshold pertaining to a case where the EGR rate is the intermediate value as a weighted moving average processing value of a first determination threshold and a second determination threshold. The first determination threshold may be the determination threshold pertaining to a case where the EGR rate is zero. The second determination threshold may be the determination threshold pertaining to a case where the EGR rate becomes the target EGR rate. The second determination threshold may exceed the first determination threshold.

According to the first aspect of this disclosure, an appropriate determination threshold can be calculated in a case where the EGR rate becomes the intermediate value between zero and the target EGR rate by using the weighted moving average processing value.

In the first aspect of this disclosure, the electronic control unit may be configured to execute processing for calculating a rotation fluctuation amount of a crankshaft of the internal combustion engine as the torque fluctuation amount.

What is claimed is:
1. A controller for an internal combustion engine including a plurality of cylinders, a fuel injection valve for supplying a fuel to each cylinder, an EGR passage connecting an exhaust passage and an intake passage, and an EGR valve adjusting a flow rate of exhaust flowing into the intake passage from the exhaust passage via the EGR passage, the controller comprising:
an electronic control unit configured to execute determination processing for determining that a degree of an imbalance abnormality is larger when a torque fluctuation amount is relatively large than when the torque fluctuation amount is relatively small, the torque fluctuation amount being a difference between torques respectively generated by the cylinders;
wherein
the degree of the imbalance abnormality is a degree of variation in air-fuel ratios in respective combustion chambers of the cylinders at a time when the fuel injection valve is operated such that the air-fuel ratios in the respective cylinders are controlled to be equalized;
the determination processing determines that the degree of the imbalance abnormality is smaller when an EGR rate is relatively large than when the EGR rate is relatively small even at the same torque fluctuation amount, the EGR rate being a value obtained by dividing an amount of exhaust flowing into the intake passage from the EGR passage by an amount of air flowing into the intake passage; and
the determination processing includes:
comparison determination processing for determining whether or not the torque fluctuation amount exceeds a determination threshold by a predetermined margin or more;
EGR rate reflection processing for setting the determination threshold to a larger value when the EGR rate is relatively large than when the EGR rate is relatively small; and threshold variable processing for variably setting the determination threshold in accordance with a rotation speed of a crankshaft of the internal combustion engine and a load of the internal combustion engine; and wherein the electronic control unit is configured to determine that the degree of the imbalance abnormality is large when the electronic control unit determines as a result of the comparison determination processing that the torque fluctuation amount exceeds the determination threshold by the predetermined margin or more.

2. The controller according to claim 1, wherein the comparison determination processing includes:
average value calculation processing for calculating an average value of comparison parameters within a predetermined period, a relative magnitude relationship between the torque fluctuation amount and the determination threshold being quantified in the comparison parameter; and
abnormality determination processing for determining, based on a magnitude of the average value, whether or not the torque fluctuation amount exceeds the determination threshold by the predetermined margin or more.

3. The controller according to claim 1, wherein:
the electronic control unit is configured to execute EGR rate control processing for controlling the EGR rate to a target EGR rate determined in accordance with an operation point of the internal combustion engine;
the EGR rate control processing includes processing for controlling the EGR rate to zero and processing for controlling the EGR rate to an intermediate value between the target EGR rate and zero in addition to processing for controlling the EGR rate to the target EGR rate; and
the EGR rate reflection processing includes processing for calculating the determination threshold pertaining to a case where the EGR rate is the intermediate value as a weighted moving average processing value of a first determination threshold and a second determination threshold, the first determination threshold being the determination threshold pertaining to a case where the EGR rate is zero, the second determination threshold being the determination threshold pertaining to a case where the EGR rate becomes the target EGR rate, and the second determination threshold exceeding the first determination threshold.

4. The controller according to claim 1, wherein the electronic control unit is configured to execute processing for calculating a rotation fluctuation amount of the crankshaft of the internal combustion engine as the torque fluctuation amount.

5. A controller for an internal combustion engine including a plurality of cylinders, a fuel injection valve for supplying a fuel to each cylinder, an EGR passage connecting an exhaust passage and an intake passage, and an EGR valve adjusting a flow rate of exhaust flowing into the intake passage from the exhaust passage via the EGR passage, the controller comprising:
an electronic control unit configured to execute determination processing for determining that a degree of an imbalance abnormality is larger when a torque fluctuation amount is relatively large than when the torque fluctuation amount is relatively small, the torque fluctuation amount being a difference between torques respectively generated by the cylinders;

wherein the degree of the imbalance abnormality is a degree of variation in air-fuel ratios in respective combustion chambers of the cylinders at a time when the fuel injection valve is operated such that the air-fuel ratios in the respective cylinders are controlled to be equalized;

the determination processing determines that the degree of the imbalance abnormality is smaller when an EGR rate is relatively large than when the EGR rate is relatively small even at the same torque fluctuation amount, the EGR rate being a value obtained by dividing an amount of exhaust flowing into the intake passage from the EGR passage by an amount of air flowing into the intake passage; and the determination processing includes:

comparison determination processing for determining whether or not the torque fluctuation amount exceeds a determination threshold by a predetermined margin or more;

EGR rate reflection processing for correcting the torque fluctuation amount compared to the determination threshold prior to the comparison determination processing such that the torque fluctuation amount becomes a smaller value when the EGR rate is relatively large than when the EGR rate is relatively small even at the same actual torque fluctuation amount; and threshold variable processing for variably setting the determination threshold in accordance with a rotation speed of a crankshaft of the internal combustion engine and a load of the internal combustion engine; and the electronic control unit is configured to determine that the degree of the imbalance abnormality is large when the electronic control unit determines as a result of the comparison determination processing that the torque fluctuation amount exceeds the determination threshold by the predetermined margin or more.

6. The controller according to claim 5, wherein the comparison determination processing includes:

average value calculation processing for calculating an average value of comparison parameters within a predetermined period, a relative magnitude relationship between the torque fluctuation amount and the determination threshold being quantified in the comparison parameter; and abnormality determination processing for determining, based on a magnitude of the average value, whether or not the torque fluctuation amount exceeds the determination threshold by the predetermined margin or more.

7. The controller according to claim 5, wherein:

the electronic control unit is configured to execute EGR rate control processing for controlling the EGR rate to a target EGR rate determined in accordance with an operation point of the internal combustion engine;

the EGR rate control processing includes processing for controlling the EGR rate to zero and processing for controlling the EGR rate to an intermediate value between the target EGR rate and zero in addition to processing for controlling the EGR rate to the target EGR rate; and the EGR rate reflection processing includes processing for calculating the determination threshold pertaining to a case where the EGR rate is the intermediate value as a weighted moving average processing value of a first determination threshold and a second determination threshold, the first determination threshold being the determination threshold pertaining to a case where the EGR rate is zero, the second determination threshold being the determination threshold pertaining to a case where the EGR rate becomes the target EGR rate, and the second determination threshold exceeding the first determination threshold.

8. The controller according to claim 5, wherein the electronic control unit is configured to execute processing for calculating a rotation fluctuation amount of the crankshaft of the internal combustion engine as the torque fluctuation amount.

9. A control method for an internal combustion engine including a plurality of cylinders, a fuel injection valve for supplying a fuel to each cylinder, an EGR passage connecting an exhaust passage and an intake passage, and an EGR valve adjusting a flow rate of exhaust flowing into the intake passage from the exhaust passage via the EGR passage, the control method comprising:

controlling an electronic control unit to execute determination processing and determine; that a degree of an imbalance abnormality is larger when a torque fluctuation amount is relatively large than when the torque fluctuation amount is relatively small, the torque fluctuation amount being a difference between torques respectively generated by the cylinders and the degree of the imbalance abnormality being a degree of variation in air-fuel ratios in respective combustion chambers of the cylinders at a time when the fuel injection valve is operated such that the air-fuel ratios in the respective cylinders are controlled to be equalized; and determining, in the determination processing and by the electronic control unit, that the degree of the imbalance abnormality is smaller when an EGR rate is relatively large than when the EGR rate is relatively small even at the same torque fluctuation amount, the EGR rate being a value obtained by dividing an amount of exhaust flowing into the intake passage from the EGR passage by an amount of air flowing into the intake passage, wherein the determination processing includes:

comparison determination processing for determining whether or not the torque fluctuation amount exceeds a determination threshold by a predetermined margin or more;

EGR rate reflection processing for setting the determination threshold to a larger value when the EGR rate is relatively large than when the EGR rate is relatively small;

threshold variable processing for variably setting the determination threshold in accordance with a rotation speed of a crankshaft of the internal combustion engine and a load of the internal combustion engine; and determining that the degree of the imbalance abnormality is large when the electronic control unit determines as a result of the comparison determination processing that the torque fluctuation amount exceeds the determination threshold by the predetermined margin or more.

10. A control method for an internal combustion engine including a plurality of cylinders, a fuel injection valve for supplying a fuel to each cylinder, an EGR passage connecting an exhaust passage and an intake passage, and an EGR valve adjusting a flow rate of exhaust flowing into the intake passage from the exhaust passage via the EGR passage, the control method comprising:

controlling an electronic control unit to execute determination processing and determine that a degree of an imbalance abnormality is larger when a torque fluctuation amount is relatively large than when the torque fluctuation amount is relatively small, the torque fluctuation amount being a difference between torques respectively generated by the cylinders and the degree of the imbalance abnormality being a degree of variation in air-fuel ratios in respective combustion chambers of the cylinders at a time when the fuel injection valve is operated such that the air-fuel ratios in the respective cylinders are controlled to be equalized; and determining, in the determination processing and by the electronic control unit, that the degree of the imbalance abnormality is smaller when an EGR rate is relatively large than when the EGR rate is relatively small even at the same torque fluctuation amount, the EGR rate being a value obtained by dividing an amount of exhaust flowing into the intake passage from the EGR passage by an amount of air flowing into the intake passage, wherein the determination processing includes:

comparison determination processing for determining whether or not the torque fluctuation amount exceeds a determination threshold by a predetermined margin or more;

EGR rate reflection processing for correcting the torque fluctuation amount compared to the determination threshold prior to the comparison determination processing such that the torque fluctuation amount becomes a smaller value when the EGR rate is relatively large than when the EGR rate is relatively small even at the same actual torque fluctuation amount;

threshold variable processing for variably setting the determination threshold in accordance with a rotation speed of a crankshaft of the internal combustion engine and a load of the internal combustion engine; and determining that the degree of the imbalance abnormality is large when the electronic control unit determines as a result of the comparison determination processing that the torque fluctuation amount exceeds the determination threshold by the predetermined margin or more.

* * * * *